(12) United States Patent
Mersola

(10) Patent No.: US 9,096,370 B2
(45) Date of Patent: Aug. 4, 2015

(54) DEVICE AND METHOD FOR ADORNING AND DECORATING BAKED GOODS

(71) Applicant: MOON CHERIE, Burbank, CA (US)

(72) Inventor: Sheri Mersola, Sun Valley, CA (US)

(73) Assignee: Moon Cherie, Burbank, CA (US)

( * ) Notice: Subject to any disclaimer, the term of this patent is extended or adjusted under 35 U.S.C. 154(b) by 0 days.

(21) Appl. No.: 14/140,441

(22) Filed: Dec. 24, 2013

(65) Prior Publication Data

US 2014/0234495 A1 Aug. 21, 2014

Related U.S. Application Data

(63) Continuation of application No. 13/185,267, filed on Jul. 18, 2011, now Pat. No. 8,695,257, which is a continuation-in-part of application No. 12/592,199, filed on Nov. 20, 2009, now abandoned.

(60) Provisional application No. 61/204,005, filed on Dec. 31, 2008.

(51) Int. Cl.
| | |
|---|---|
| *G09F 23/00* | (2006.01) |
| *B65D 81/34* | (2006.01) |
| *A21C 15/00* | (2006.01) |
| *B65D 85/36* | (2006.01) |
| *A21D 10/02* | (2006.01) |

(52) U.S. Cl.
CPC ............... *B65D 81/34* (2013.01); *A21C 15/00* (2013.01); *A21D 10/025* (2013.01); *B65D 85/36* (2013.01); *B65D 2203/00* (2013.01)

(58) Field of Classification Search
CPC ........... A23G 3/28; B65D 75/54; B65D 65/14
USPC .................... 426/87, 383; D7/354; 40/637
See application file for complete search history.

(56) References Cited

U.S. PATENT DOCUMENTS

| | | | |
|---|---|---|---|
| 1,849,774 A | 3/1932 | Taylor | |
| 2,194,220 A | 3/1940 | Elder | |
| 4,024,287 A | 5/1977 | Golchert | |
| 4,285,978 A | 8/1981 | Quinlivan | |
| D278,116 S | 3/1985 | Gavin et al. | |
| 4,546,875 A | 10/1985 | Zweber | |
| 4,661,188 A | 4/1987 | Fumei | |
| 4,817,801 A * | 4/1989 | Schwaikert | 206/519 |
| 5,149,291 A | 9/1992 | Di Franco et al. | |
| 5,866,181 A | 2/1999 | Hill | |
| 6,030,477 A * | 2/2000 | Olvey | 156/82 |
| 6,210,731 B1 | 4/2001 | Brissonneau | |
| 6,280,825 B1 * | 8/2001 | Olvey | 428/182 |
| 6,295,758 B1 | 10/2001 | Weder et al. | |

(Continued)

OTHER PUBLICATIONS

Ultra Green Film Product Sheet from GPA Specialty Substrate Solutions, available at http://www.askgpa.com/products/pdf/prod/Ultra_Green_Indigo.pdf, Date Unknown.

(Continued)

*Primary Examiner* — Shin Kim
(74) *Attorney, Agent, or Firm* — Kolisch Hartwell, P.C.

(57) ABSTRACT

A sleeve is disclosed for adornment and decoration of a baked good, including reshaping, to produce an appearance other than that of the original baked good. The sleeve may be constructed of a mineral-based substrate including a graphic on an outer surface.

19 Claims, 2 Drawing Sheets

(56) References Cited

U.S. PATENT DOCUMENTS

| | | |
|---|---|---|
| 6,432,462 B2 | 8/2002 | Brissonneau |
| 6,450,341 B1 * | 9/2002 | Krupa et al. .................. 206/497 |
| 6,591,524 B1 | 7/2003 | Lewis et al. |
| 6,616,958 B1 | 9/2003 | Stewart |
| 6,652,897 B1 | 11/2003 | Stewart |
| 7,037,471 B1 | 5/2006 | Perlman |
| D578,338 S | 10/2008 | Vendl et al. |
| D586,175 S | 2/2009 | Frank |
| 8,011,532 B2 * | 9/2011 | Griswold ..................... 220/772 |
| D675,479 S * | 2/2013 | Phillips ......................... D7/507 |
| 2002/0029503 A1 | 3/2002 | Lam |
| 2003/0161913 A1 | 8/2003 | Stewart |
| 2004/0033293 A1 | 2/2004 | Albert |
| 2005/0005492 A1 | 1/2005 | Pawlak |
| 2005/0031752 A1 | 2/2005 | Koplish |
| 2005/0211101 A1 * | 9/2005 | Finnie ............................ 99/279 |
| 2006/0251777 A1 | 11/2006 | Koplish |
| 2008/0095908 A1 * | 4/2008 | Vendl et al. .................. 426/549 |
| 2010/0278979 A1 | 11/2010 | Koplish |

OTHER PUBLICATIONS

Moon Cherie, archived web pages from the website at http://www.roundaboutsleeves.com/indx.html., that were accessible over the Internet at least as early as Feb. 5, 2009.

Jun. 4, 2012, Office action in U.S. Appl. No. 12/592,199, which shares the same priority as this U.S. application.

Feb. 14, 2013, Office action in U.S. Appl. No. 13/185,267, which shares the same priority as this U.S. application.

* cited by examiner

DEVICE AND METHOD FOR ADORNING AND DECORATING BAKED GOODS

CROSS-REFERENCE TO RELATED APPLICATION

This application is a continuation of U.S. patent application Ser. No. 13/185,267, entitled "DEVICE AND METHOD FOR ADORNING AND DECORATING BAKED GOODS", which was filed Jul. 18, 2011, which is a continuation-in-part of U.S. patent application Ser. No. 12/592,199, entitled "DEVICE AND METHOD FOR ADORNING AND DECORATING BAKED GOODS", which was filed on Nov. 20, 2009, which itself claimed priority to U.S. Provisional Patent Application Ser. No. 61/204,005, which was filed Dec. 31, 2008, each of which is hereby incorporated by reference in its entirety for all purposes.

BACKGROUND

Adornment and decorating of baked goods is an art practiced by many a baker; not just at home, but also in the baking industry. Adornment and decoration includes the use of icing and other coverings, colorings, forming baked goods into specific shapes. However, these types of adornment and decoration consume resources, for example, resources consumed by additional preparation steps, resources consumed by the use of additional material, as well as resources consumed by additional costs incurred. A method for adorning and decorating baked goods that reduces resource consumption would therefore be of value to those skilled in the art of baking goods.

SUMMARY

In one embodiment, an article for adorning and decorating a baking good comprises a sleeve material, the material comprising a first side and a second side, a length, a height, thickness and a graphic disposed on a first side of the material; whereby with a first end of the length joined to a portion of the length and around a baking good, the sleeve material contextually enhances the baking good to adorn/decorate the baking in accordance with the graphic. In one embodiment, the material comprises cellulose based material. In one embodiment the material comprises an edible material. In one embodiment, the material comprises a polymer. In one embodiment, the first side comprises a substantially smooth surface. In one embodiment, the first end comprises an adhesive. In one embodiment, the first end comprises a fastener. In one embodiment, the material is capable of being heated to a baking temperature. In one embodiment, a particular one of the sleeve material can be used with more than one sized baking good. In one embodiment, the material is joined around a lower portion of the baking good. In one embodiment, the graphic comprises a theme selected from the group of persons, personalities, caricatures, themes, holidays, celebrations, things, and activities.

In one embodiment, a method of decorating/adorning a baked good, comprises the steps of: providing at least one baked good; and encircling the at least one baked good with a sleeve material having a graphic printed thereupon. In one embodiment, only the lower portion of the baked good is encircled by the sleeve material. In one embodiment, the step of providing at least one baked good comprises providing an assembly line of baked goods. In one embodiment, the at least one baked good comprises batter. In one embodiment, a step of baking the at least one baked good is included. In one embodiment, the step of providing at least one baked good comprises providing more than one sized baked good.

In one embodiment, a system for adorning and decorating a baking good, comprises a sleeve material, the material comprising a first side and a second side, a length, a height, a thickness, whereby with a first end of the length joined to a portion of the length and around a baking good, the sleeve material contextually enhances the baking good to adorn/decorate the baking in accordance with one or more graphic; and a storage media comprising the one or more graphic. In one embodiment, the system further comprises baking components. In one embodiment, the graphic comprises a theme selected from the group of persons, personalities, caricatures, themes, holidays, celebrations, things, and activities.

Other objects, benefits, advantages, and embodiments will become apparent upon a reading of the present invention below.

DETAILED DESCRIPTION

Figure 1:
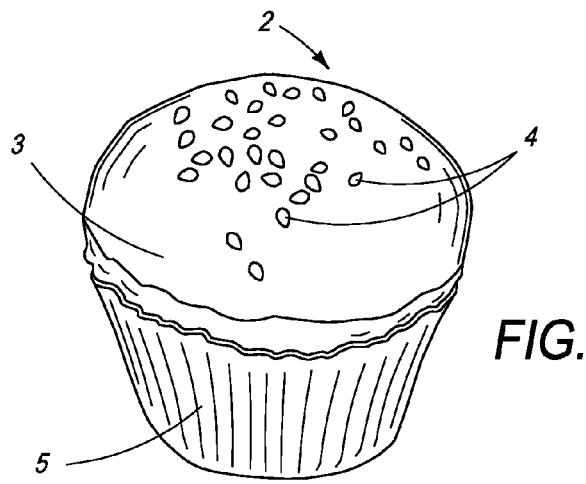
FIG. 1 illustrates a baked good.

Referring now to FIG. 1, there is seen a conventional baked good. The baked good (2) shown in FIG. 1 may be formed by: creating batter, pouring the batter into a form (5), and heating the baked good. The form (5) may comprise a shaped metal or a pleated paper known to those skilled in the baking arts. Such prior art forms are known to comprise sides and a bottom that acts to retain the batter within its confines during baking in an oven or other heating device.

In one embodiment, a baked good comprises a cupcake (2). In embodiments, an upper portion of cupcake (2) is adorned/decorated with brown color, brown icing (3), and/or sesame seeds (4). To the extent that cupcake (2) has been described so far, those skilled in the baking arts will identify/associate the cupcake with that of a conventional baked good that when first viewed, appears to be no more than an ordinary conventional cupcake.

Figure 2A:
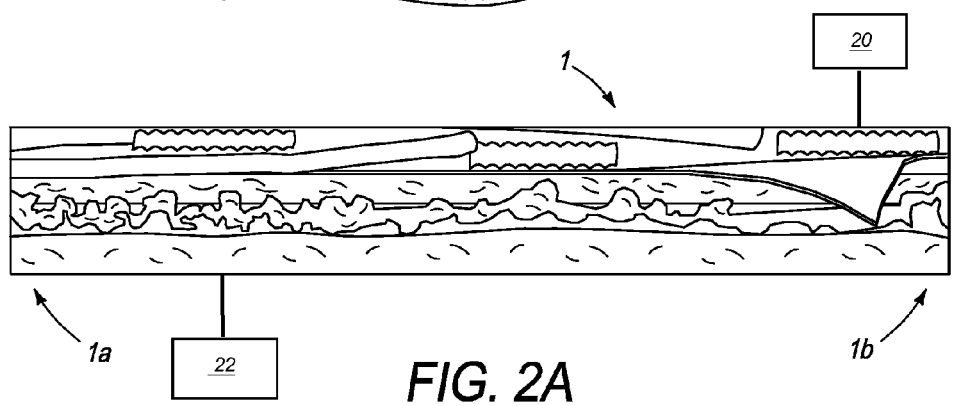
FIGS. 2a and 2b illustrate a sleeve material of the present disclosure.
Figure 2B:
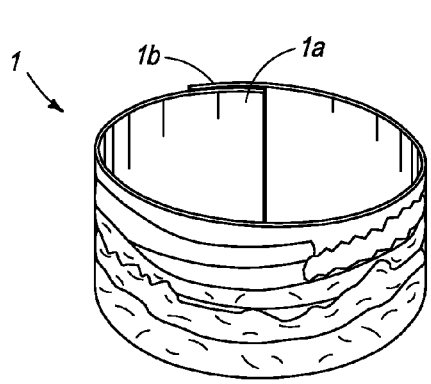

Referring now to FIGS. 2a and 2b, and preceding figures as needed, there is seen an article comprising a sleeve material. In a preferred embodiment, sleeve material (1) comprises two sides and two ends (1a, 1b). In one embodiment, one or both ends (1a, 1b) are provided with attachment means that enable one or both ends to be permanently or semi-permanently attached/joined to the each other. In the preferred embodiment, one or both ends (1a, 1b) comprise adhesive applied to one or both sides of sleeve material (1). In other embodiments, one or more portion of sleeve material (1), for example ends (1a, 1b), comprise adhesive, serrations, snaps, fasteners, magnets, or other attachment means.

In an exemplary embodiment, sleeve material (1) is about 8.25 inches long, 1.3 inches wide, and 0.01 inches thick. In other embodiments, sleeve material (1) is dimensioned according to a particular baked good it is to be used with. Although in the preferred embodiment sleeve material (1) comprises at least one side that is substantially smooth over at least the length and width of one side, in other embodiments at least a portion of one side of the material may comprise a raised surface, for example, as may be achieved via a stamping process, or the like.

In some examples, sleeve material (1) comprises a cellulose based material, for example, paper. In an embodiment, sleeve material (1) comprises a polymer based material, for example, plastic. In one embodiment, sleeve material (1) and/or adhesive at end(s) (1a, 1b) comprise a composition that is safe for human consumption. In one embodiment, sleeve material (1) and/or adhesive at end(s) (1a, 1b) comprise an edible material. In one embodiment, sleeve material (1) comprises a material able to resist an amount of heat, for example, an amount of heat needed to bake or warm a cupcake. In one embodiment, it is envisioned that sleeve material (1) may be joined to be used as a form into which batter may be poured and then baked to form cupcake (2). In embodiments, sleeve material (1) is flexible, semi-rigid, bendable, or otherwise capable of being shaped to substantially encircle cupcake (2).

In embodiments, sleeve material (1) comprises a graphic that is printed, stamped, embossed, or otherwise affixed to or on the material. In an exemplary embodiment, sleeve material (1) has printed thereupon the makings of a hamburger, including: bun, meat patty, lettuce, and tomatoes. In one embodiment, the makings of the hamburger are printed in ink. In one embodiment, the ink comprises food coloring. In one embodiment, the ink is non-toxic. In one embodiment, the ink is edible.

Figure 3:
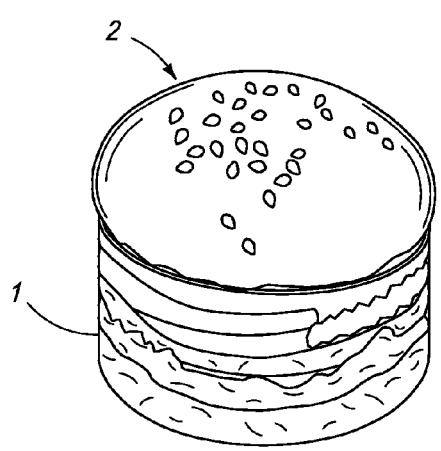
FIG. 3 illustrates a lower portion of a baked good encircled by a sleeve material.

Referring now to FIG. 3, and preceding figures as needed, there is seen a lower portion of a baked good encircled by a material of the present invention. In an exemplary embodiment of use, a lower portion of a conventionally decorated cupcake (2) is encircled by sleeve material (1). In one embodiment, a lower portion of cupcake (2) is encircled by sleeve material (1) before or after application of conventional adornments/decorations to an upper portion of the cupcake. In one embodiment, after a lower portion of cupcake (2) is encircled with sleeve material (1), one end of the material (1a, 1b) is joined to a portion of the length of the material. In the preferred embodiment, ends (1a, 1b) are joined together. In an alternative embodiment, ends (1a, 1b) of sleeve material (1) are joined together, and then cupcake (2) is placed within the void defined by the material. In an alternative embodiment, it is envisioned that sleeve material (1) may encircle cupcake (2) and be attached thereto via a chemical or mechanical attachment reaction with the outer surface of the cupcake.

Referring back to FIGS. 1, 2a and 2b, there is seen that when a cupcake (2) is viewed alone it elicits a first association/identification with that of a conventional cupcake, and sleeve material (1) when first viewed elicits a first association/identification with that of a hamburger, where each association/identification is mutually exclusive of the other.

The inventors have identified that baked goods can be adorned/decorated via use of a sleeve material (1) of the present invention. Such adornment/decoration occurs via a contextual enhancement the material of the present invention provides to a baked good. For example, when a cupcake (2) is encircled by the sleeve material (1) of FIG. 3, a first association/identification of cupcake (2) is changed from that of a conventional cupcake to that of a hamburger.

Figure 4:
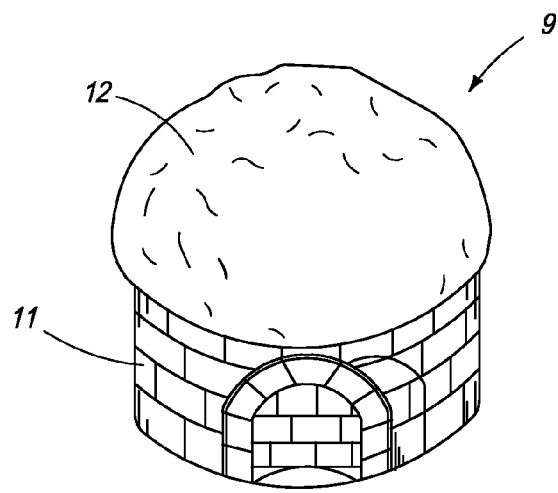
FIG. 4 illustrates a baked good encircled by a sleeve material.

Referring now to FIG. 4, and preceding figures as needed, there is seen a cupcake encircled by another embodiment of the present invention. In FIG. 4, a material (11) is seen to comprise a graphic depicting a lower portion of an igloo. As is seen, simple and quick encirclement of a conventional cupcake (9) that is adorned with coconut flakes (12) by the material (11) causes the cupcake to be contextually enhanced so as to be associated/identified as an igloo. Unlike the prior art, the present invention thus enables ordinary conventional baked goods to be adorned/decorated simply and quickly and with reduced material, preparation time, and costs.

Figure 5:
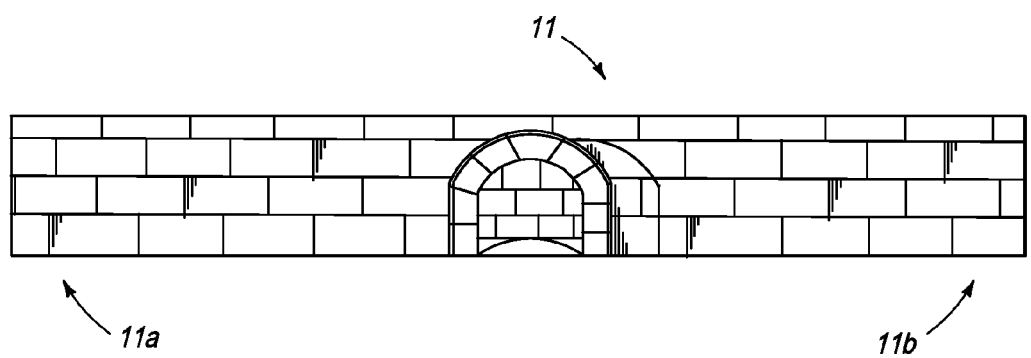
FIG. 5 illustrates another example of a baked good encircled by a sleeve material.

Referring now to FIG. 5, and preceding figures as needed, there is seen an embodiment of the present invention. In FIG. 5, the material (11) of FIG. 4 is shown in a front fully with ends 11a and 11b fully extended.

Unlike the prior art, the invention as described herein enables a wide variety of baked goods to be adorned/decorated via use of a simple, inexpensive, and quick to implement material and method of use. For example, the present invention minimizes expenditures by reducing or eliminating icing, coverings, and/or coloring that would be needed to create a cupcake that elicits the first association/identification provided by the present invention.

The present invention enables application of adornments/decorations in bulk and to large batches of baked goods, for example, as in a baked good manufacturing process, where baked goods may be adorned/decorated via encirclement by the material of the present invention in a rapid assembly line manner. In an assembly line process, the material of the present invention suits itself well to rapid robotic manipulation and application.

The present invention enables one material to be used with more than one size of baked good. For example, the material of the present invention may initially be oversized in length. When oversized in length, a subsequent attachment of an end of the material to a portion of its length allows different diameter baked goods to be encircled by one material. The present invention also enables its use in other applications, for example, the material of the present invention may be easily dimensioned so as to enable the ends to be joined/formed into a handle portion that could be used to hold, support, and/or transport a baked good that is encircled by the material.

The material of the present invention may be created in quantities of attached or detached preprinted or blank material. When created as blank material, the material may be bundled with software code and/or storage media that enables printing of images or graphics so as effectuate a desired graphic on the material. Quantities of material of the present invention may also comprise part of a kit, where such a kit may include one or more baking component, material, and software and/or storage media.

Although shown with graphics of a hamburger and an igloo in the embodiments above, the material of the present invention may comprise other graphics, including but not limited to: graphics of persons, personalities, caricatures, themes, holidays, celebrations, things, and activities. The reader of the present patent/application is invited to visit http://www.roundaboutsleeves.com to view these and other embodiments.

It is understood that the term baked goods encompasses a wide variety of goods, for example, not just cupcakes, but as well: cakes, pies, torts, cookies, as well as other baked goods that are known to and practiced by those skilled in the baking profession.

In some examples, a sleeve material (1) may include a suitable non-cellulose, non-plastic film substrate. For example, a suitable film substrate may be made from inorganic mineral powders such as calcium carbonate, with a high-density polyethylene (HDPE) bonding agent and a small amount of non-toxic resin. An illustrative suitable film substrate is Ultra Green™ Film, currently distributed by GPA Specialty Substrate Solutions.

Use of such film substrates for sleeve material (1) provides significant benefits specific to use regarding adornment and decoration of baked goods. In addition to paper-like printability, these benefits include resistance to water, grease, oil, and ultraviolet radiation; ease of manipulation; inelasticity; antistatic properties; structural sturdiness; dimensional stability; low heat transfer; reduced ink usage requirements; and a smooth surface. Additionally, film substrate sleeves provide ease of recovery from decorating errors by the wipe-clean capacity of the sleeve material; act as a food safety, mechanical, insect, and odor barrier; and may provide a uniformity of appearance for a plurality of baked goods. Film substrate sleeve materials may also have antimicrobial properties, which further improve food barrier functionality, especially since baked goods often must be transported and manipulated by hand. Sleeves may be used to replace the original baking liner after baking, or may be used during the baking process. Sleeves may also be configured with a textured exterior to provide grip and enhance appearance. Sleeves may also contain texturally communicated data, such as information provided in Braille.

In some examples, sleeve lengths may be from about 7.85 inches to about 12.35 inches. Sleeve material (1) may also be configured in a continuous strip, which may have appropriate perforations, slits, or markings at intervals corresponding to individual lengths of material. Sleeve material thickness may be about 0.008 inches to about 0.016 inches. Fastening or attachment elements are included at least at one end of sleeve material (1). Preferably, these fastening elements allow one end of sleeve material (1) to be attached to any other surface of sleeve material (1) to produce a loop of material having a selectable, continuously variable diameter. The dimensions of sleeve material (1) allow the sleeve to encircle a baked good having any one of a wide range of circumferences, limited only by the length of the sleeve and the space needed for fastening. A portion of the sleeve material may be detachable, for example to allow a user to retain an informational tab, to eliminate an unused length of material, or for purchase-related reasons such as proof-of-purchase.

Sleeves such as those described above may be used to adorn and decorate a baked good, where adorning includes reshaping at least a portion of the baked good into a cylindrical shape. For example, the lower portion of a cupcake may be reshaped from its typical inverted-frustoconical shape to a substantially cylindrical shape by encircling the lower portion with a sleeve material (1) and fastening it in place. Furthermore, the sleeve material may be fastened with varying degrees of tightness around the baked good, and the diameter of the baked good may be affected correspondingly. For example, the sleeve material may be fastened such that it contacts the upper 25% of the lower portion of a cupcake, tightened snug enough to ensure the sleeve material remains attached to the cupcake.

In another example, the sleeve material may instead be fastened around the lower portion of a cupcake and tightened significantly such that the upper circumference of the cupcake substantially equals the bottom circumference of the cupcake. The end result in any event is that at least part of the baked good is reshaped by the sleeve material into a cylinder, for example as depicted in FIGS. 3 and 4. In addition, the width of the sleeve material may be sized such when the sleeve is attached to a baked good, the bottom edge of the sleeve contacts a supporting surface such as a plate or table, but the bottom of the baked good is held up off the supporting surface by the sleeve. For example, this arrangement may form a stand for the baked good.

The cylindrical reshaping described above leads to several unexpected benefits. These benefits include a reduced need for frosting and other toppings due to a uniform and smaller diameter cupcake top; greater stability of the baked good when placed on a surface; reduced food contact due to elevation of the baked good above a surface; easier handling and decorating due to simple shape and uniformity of multiple baked goods; more pleasant overall appearance; smaller or more uniform footprint; elimination of natural variation in the sizes or shapes of baked goods; facilitation of storage or packing of multiple baked goods side by side in a smaller space; a consistent and structured edge that acts as a physical guide for spiral, swirl, and ridge effect techniques and the like; standardized height of baked goods; and facilitation of labeling or coding. Additionally, the cylindrical shape of the sleeve material may be configured to extend above the upper edge of the baked good, allowing containment of additional materials that would otherwise be difficult to place atop a baked good, such as liquids, gels, and mousses.

Additional apparatuses may be attached to, disposed on, or embedded within a sleeve material (1). For example, suitable integrated circuit (IC) chips may be used to provide pre-recorded or recordable sound effects such as music or customized greetings. In other examples, lighting effects such as LED lights or fiber optics may be utilized. For example, a motor vehicle theme may be enhanced by providing engine sound effects and/or glowing headlights.

As mentioned above, a sleeve material (1) may be configured such that in addition to the cylindrical shaping, the sleeve also forms a tab, loop, or handle when fastened around a baked good. The handle or handles may be located on a side, under or over the baked good, or any combination of these.

Sleeve materials may be combined with additional suitable components to form a system or kit. For example, a plurality of sleeves may be combined with additional decorations or decorating tools, and provided to users as a package. These kits may be assembled according to a selected common theme or concept. Materials for baking may also be included, such as baking pans, recipes, and/or unbaked ingredients such as cake mix or refrigerated batter.

Although embodiments are described herein in the context of a cupcake, the scope of the disclosure should be construed to encompass a much wider range of baked goods and applications, and should be limited only by the claims.

I claim:

1. A method for adorning and decorating a baked cupcake including:
    encircling a baked cupcake with a rectangular strip of film substrate, the film substrate comprising a composition of an inorganic mineral powder and a high density polyethylene (HDPE), the strip having a graphic on an outer surface;
    reshaping at least a lower portion of the cupcake into a cylinder by selecting a diameter of the encircling strip to be smaller than an original perimeter of the lower portion of the cupcake; and
    fastening a first end portion of the strip to a second end portion of the strip to secure the strip at the selected diameter;
    wherein the graphic and the reshaping cause the cupcake to have an appearance other than the appearance of a standard cupcake.

2. The method of claim 1, wherein the inorganic mineral powder includes a calcium carbonate powder.

3. The method of claim 1, wherein fastening the first end portion to the second end portion includes using an adhesive.

4. The method of claim 3, wherein the first end portion of the strip comprises the adhesive.

5. The method of claim 1, wherein encircling the baked cupcake includes encircling a paper baking cup on an outer surface of the lower portion of the cupcake, the paper baking cup being at least partially disposed between the cupcake and the rectangular strip.

6. The method of claim 1, wherein encircling the baked cupcake includes ensuring a portion of the rectangular strip extends beyond a bottom surface of the cupcake to form a stand for the cupcake.

7. The method of claim 1, further including placing the encircled and reshaped cupcake on a support surface with only an edge of the rectangular strip contacting the support surface.

8. A method for adorning and decorating a baked cupcake including:
   encircling a baked cupcake with a strip of material that is substantially inelastic relative to the cupcake, the strip of material including a film substrate comprising a composition of an inorganic mineral powder and a high density polyethylene (HDPE);
   fastening the strip of material such that at least a lower portion of the cupcake is reshaped by the strip of material.

9. The method of claim 8, wherein reshaping the lower portion of the cupcake includes reshaping the lower portion of the cupcake into the shape of a cylinder.

10. The method of claim 9, wherein the cupcake has an upper circumference, and reshaping includes causing the upper circumference of the cupcake to substantially narrow in size.

11. The method of claim 8, wherein the strip of material is fastened such that an inner surface of the strip contacts an upper 25% of the lower portion of the cupcake.

12. The method of claim 8, further including removing a baking liner from the cupcake before encircling the baked cupcake with the strip of material.

13. The method of claim 8, wherein the material comprises a water-resistant film substrate.

14. The method of claim 13, wherein the film substrate is oil-resistant.

15. A method for adorning and decorating a baked good including:
   providing a baked good having a frustoconical lower portion;
   encircling at least the lower portion of the baked good with a generally rectangular strip of film substrate, the strip being substantially inelastic relative to the baked good, the film substrate comprising a composition of an inorganic mineral powder and a high density polyethylene (HDPE);
   fastening the strip around the baked good such that at least part of the lower portion is reshaped into a cylinder.

16. The method of claim 15, wherein fastening the strip includes fastening the strip such that a portion of the strip extends beyond the baked good.

17. The method of claim 15, wherein fastening the strip includes fastening the strip such that an upper edge of the strip extends continuously beyond an upper end of the lower portion.

18. The method of claim 17, further including adding decorative materials to an upper surface of the baked good, the decorative materials being laterally contained by the strip.

19. The method of claim 18, wherein the decorative materials laterally contained by the strip comprise frosting.

\* \* \* \* \*